United States Patent

[11] 3,556,070

| [72] | Inventor | Clifton R. Holcomb |
| | | 540 South Sandusky, Tulsa, Okla. |
| [21] | Appl. No. | 787,893 |
| [22] | Filed | Dec. 30, 1968 |
| [45] | Patented | Dec. 19, 1971 |

[54] SOLENOID VALVE PRE-OILER
8 Claims, 3 Drawing Figs.

[52] U.S. Cl. ................................................ 123/196,
184/6, 251/120
[51] Int. Cl. ............................................ F01m 1/12,
F01m 1/16
[50] Field of Search ........................................ 251/120;
184/6, 6A; 123/196S

[56] References Cited
UNITED STATES PATENTS

| 2,755,787 | 7/1956 | Butler et al. .................. | 184/6X |
| 2,837,174 | 6/1958 | Lyden ........................... | 184/6X |
| 2,867,203 | 1/1959 | Easton et al. .................. | 123/196 |
| 2,889,821 | 6/1959 | Maki ............................ | 184/6X |
| 3,422,807 | 1/1969 | Waldecker ..................... | 184/6X |
| 3,425,404 | 2/1969 | Lamkin ......................... | 123/196 |

Primary Examiner—Manuel A. Antonakas
Attorney—Head and Johnson

ABSTRACT: A preliminary lubricating device for internal combustion engines is described in which lubricant is stored under pressure during off periods of the engine to be released upon closing of the starting circuit so that lubricant will flow immediately to parts of the engine which normally do not receive lubrication until the conventional lubricating system has built up pressure. A pressurizable reservoir is in communication with the lubricating system of the engine and flow of lubricant into and from the reservoir is controlled by a paraboloidal piston acting in a valve controlled by a solenoid which in turn is actuated by an electrical system of the starter circuit. The paraboloidal surface of the piston assists in moving the piston to an open position in the valve body in reaction to the flow of lubricant in two directions through the valve body.

PATENTED JAN 19 1971         3,556,070

INVENTOR.
CLIFTON R. HOLCOMB

BY Head & Johnson

ATTORNEYS

INVENTOR.
CLIFTON R. HOLCOMB
BY Head & Johnson
ATTORNEYS

SOLENOID VALVE PRE-OILER

BACKGROUND OF THE INVENTION

This invention relates to lubricating systems for mechanical systems such as prime movers as exemplified by internal combustion engines, and more particularly to preliminary lubricating systems for conventional internal combustion engines.

In a conventional internal combustion engine, for example, lubricant is supplied by force to the various operative components during the operation of the engine. However, after the engine has become inoperative for some time, this lubricant drains away from the surfaces which normally bear against each other. Then, as the engine is started again, the engine must operate for a short period of time before suitable pressure is built up in the lubricating system to provide proper lubrication. During this period of time the various surfaces which move against each other are subject to more wear than during the period of normal operation of the engine. This wear becomes particularly critical when the engine has been standing for a substantial time during cold weather since then the oil is more viscous and is not readily pumped.

The problem of overcoming this lack of lubrication during the initial start up period has been solved to some extent by the incorporation in internal combustion engines of various lubricating devices known as preliminary lubricating systems or preoilers. A number of these devices may be found in the prior art as, for example, the device described in U.S. Pat. No. 2,867,203 and the device described in U.S. Pat. No. 2,755,787. Both of these patents describe preliminary lubricating devices in which lubricant is stored in a pressurizable container communicating with the usual lubricating system of the engine and from which lubricant is emitted into the lubricating system by actuation of a solenoid valve. However, the arrangement of component parts as described in these patents is more complicated than that in this invention and the operation is performed in a different manner.

The primary object of this invention is to provide a preliminary lubricating device which is efficient in operation, simple in construction, and inexpensive and easy to manufacture.

Another object of this invention is to provide a preliminary lubricating device which will have a minimum of operating parts and, when installed on an engine will require a minimum amount of maintenance.

Still another object of this invention is to provide a preliminary lubricating device which is actuated by the starting circuit of an internal combustion engine to supply lubricant under pressure to portions of the engine during an initial starting period before the main lubricating system is able to build up operating pressure.

BRIEF DESCRIPTION OF THE DRAWINGS

Further objects and advantages of the invention will become apparent from the following description and claims, and from the accompanying drawings, wherein:

DESCRIPTION OF THE PREFERRED EMBODIMENT

Figure 1:
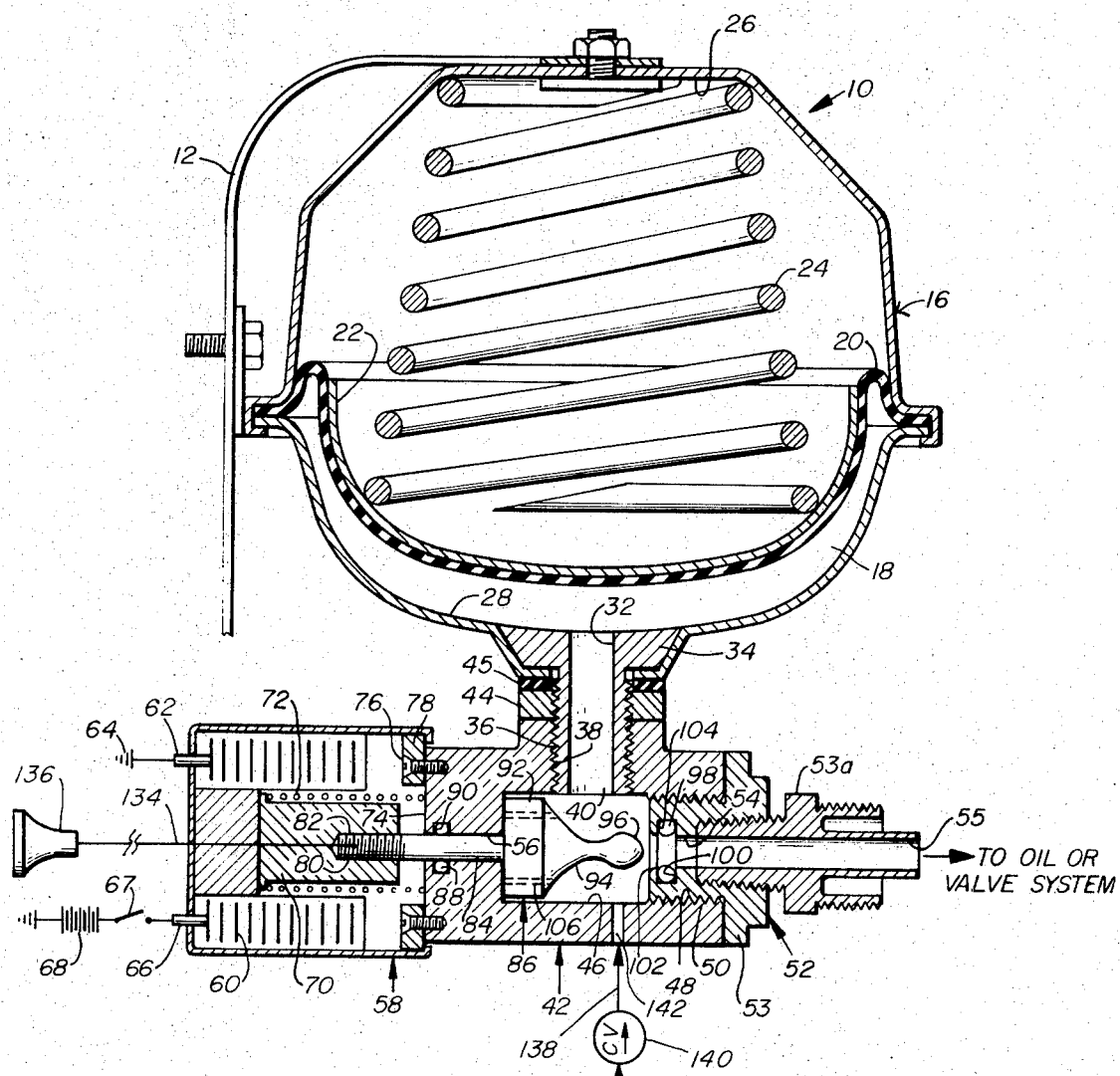
FIG. 1 is a cross-sectional view of a preliminary lubricating device according to this invention showing a valve potion of the device in an open condition.

The preliminary lubricating device of this invention may be incorporated into an engine having an electrical ignition circuit and a pressurizable lubricating system. The preliminary lubricating device itself includes a lubricant reservoir communicating with the pressurizable lubricating system of the engine with the communication between the reservoir and the lubricating system being controlled by a solenoid valve arranged in series connection to the electrical ignition circuit of the engine. When used with an engine in which the electrical ignition circuit includes a starter circuit, the field coil of the solenoid valve is connected in series with the starter circuit so that actuation of the starter circuit actuates the solenoid valve to permit lubricant maintained in the reservoir under pressure to flow into the lubricating system of the engine to provide lubrication to those parts of the engine which otherwise do not receive lubrication during the initial start up of the engine. A single solenoid valve is used in the preliminary lubricating device and is positioned so that the armature of the solenoid valve is attached to the shaft of a piston within the valve body. Thus, communication between the engine lubricating system and the lubricant reservoir is controlled by a single piston within the valve body. The piston is spring biased to a closed position with reference to the lubricating system so that as pressure develops in the engine lubricating system the piston is moved to an open position to permit fluid to flow into the reservoir until pressure in the reservoir equals pressure in the lubricating system, at which time the spring biased piston moves to its closed position. Thus, when the piston closes communication between the reservoir and the engine lubricating system, the lubricating fluid in the reservoir is maintained at a pressure equal to the normal operating pressure of the engine lubricating system. Upon actuation of the engine starting circuit, the solenoid causes the piston to move to an open position and the valve permits the pressurized fluid in the reservoir to flow into the now unpressurized lubricating system to provide an initial lubrication in the engine's parts. Under normal circumstances, the starter circuit of an internal combustion engine then becomes inactive after the engine starts and consequently the solenoid circuit of this invention also becomes inactive at that time which permits the piston to assume its normally closed position. The piston of this invention is of special configuration and is positioned in a valve body in which the communication between the reservoir and lubricating system are through a first and second bore positioned at substantially right angles to each other. A medial surface of the piston has a paraboloidal configuration. An adjacent anterior surface which bears against the closure member has a substantially spheroidal configuration. The paraboloidal surface is exposed to the flow of lubricant in either direction, form the reservoir to the lubricating system or from lubricating system to reservoir, depending upon conditions extant at the time. The paraboloidal surface is acted upon by flowing lubricant impinging upon it. Lubricating fluid impinging upon the paraboloidal surface will cause the valve to remain open for a sufficient length of time, once it has been fully opened, to permit a maximum amount of lubricating fluid to flow from the reservoir into the lubricating system. The valve will remain open until the pressure differential between the lubricating system and the reservoir provides a force less than the force of the spring, after which the spring forces the piston closed to a closed position.

Referring now to the drawings in detail, a preliminary lubricating accumulator 10 is secured to an internal combustion engine by means of a suitable bracket 12 and positioned so as to communicate with a lubricant line of the engine's conventional lubricating system. The preliminary lubricating device has means to provide pressurized storage of lubricant which includes an accumulator container 16 having therein a lubricant reservoir 18 provided by the sealable engagement of a flexible diaphragm 20 within a lower potion of accumulator 16. Flexible diaphragm 20 has abutting thereto a rigid pressure plate 22 which contacts a major portion of diaphragm 20 to maintain diaphragm 20 in a substantially symmetrical position within accumulator 16 during operation of the lubricating device. FIG. 1 describes a coil spring 24 which abuts pressure plate 22 at one end and an upper interior surface 26 of accumulator 16 at another end so is to bias flexible diaphragm 20 toward a lower end 28 of accumulator 16 in a manner that reservoir 18 normally assumes a condition of reduced volume. Other force means than spring 24 may be utilized in the accumulator 10 such as fluid pressure. Thus, lubricating fluid entering reservoir 18 through passageway 32 in threaded fitting 34 must fill reservoir 18 against a resistive force supplied to diaphragm 20 by a spring 24. Plate 22 distributes the force of spring 24 over the surface of diaphragm 20 to reduce wear on diaphragm 20. Threaded fitting 34 has exterior threads 36 which cooperate with interior threads 38 in opening 40 of valve body 42. Accumulator 16 may be secured to valve body 42 by means of a machine bolt 44 and sealed against leakage by a gasket 45. Valve body 42 may be of any external configuration but preferably has a cylindrical interior bore 46 which at one end includes a portion of interior threads 48 which cooperate with exterior threads 50 of a specialized fitting 52 comprised of a larger diameter fitting 53 and a smaller fitting 53a. Specialized fitting 52 has a bore 54 which communicates with bore 55 of fitting 53a to provide means for passage of fluid from bore 56 into a lubricant line. Communicating with a second end of bore 46 is a reduced bore 56 which provides an opening through the exterior of valve body 42. Secured to an end of the valve body 42 adjacent bore 56 is a conventional solenoid coil 58 which has therein the usual field coil composed of windings 60 having a first terminal 62 connected to ground 64 and a second terminal 66 connected to switch 67 of the starter circuit which is further connected to one side of battery 68, the other side of which is grounded. Although the solenoid coil 58 is shown as a direct axial force, it is to be understood that the valve shaft may be connected with the solenoid in other positions to achieve greater mechanical advantage. Disposed interiorly of solenoid coil 58 is an armature which may have a conventional iron core 70 which is free to move longitudinally of solenoid coil 58. Armature 70 is biased by means of coil spring 72 towards valve body 42. That is, armature 70 is normally positioned adjacent shoulder 74 of valve body 42 until actuation of solenoid coil 58 causes armature 70 to move away therefrom against the biasing force of coil spring 72. Solenoid coil 58 is held in position against valve body 42 by means of machine screws 76 passing through a washer 78 secured within an end of solenoid 58. Armature 70 has a partial bore therein which receives, as by means of internal threads 80, external threads 82 of a piston shaft 84 which passes through reduced bore 56 and enters bore 46 of valve body 42, and is connected within valve body 42 to one end of a valve piston 86 operating slidably within bore 46. Shaft 84 is positioned sealably within valve body 42 by means of an O-ring 88 set in a circumferential channel 90 in reduced bore 56. Thus, shaft 84 may move slidably within reduced bore 56 without permitting lubricating fluid to enter solenoid 58. Piston 86 has a circumferential portion 92 which fits closely within bore 46 to guide piston 86 properly. Coil spring 72 may also be positioned within bore 46 to bear against the rear portion of piston 86. A medial portion of piston 86 is formed into a reduced section having a paraboloidal surface 94 which provides a unique property of this invention. Interior of and joining paraboloidal surface 94 is a spheroidal surface 96 which acts as a closure surface for piston 86. In the closed position of piston 86, spheroidal surface 96 abuts an O-ring 98 situated in circumferential channel 100 to close communication between bore 46 and lubricating line 14. Surface 96 pushes against O-ring 98 with sufficient force to close the valve body to passage of lubricant, but O-ring does not become distorted since surface 96 contacts curved surface 102 of wall 104 and piston 86 is therefore limited in its forward movement. Piston 86 has a longitudinal passageway 106 which permits lubricant to pass from a trapped position behind piston 86 into bore 46 at the front of piston 86. Piston 86 does not need to fit sealably in bore 46. Consequently, some lubricant may become trapped behind piston 86. Passage 106 is therefore of a small diameter so that lubricant flowing therethrough will not interfere with lubricant impinging against the front surfaces of piston 86.

During normal operation of the internal combustion engine to which this preliminary lubricating device is attached, the lubricating system of that engine builds up a working pressure which is usually in the range of 40 to 50 pounds per square inch. If, at this time, spheroidal surface 96 abuts O-ring 98 to prevent communication with reservoir 18 of the engine's lubricating system, pressure in the system will gradually build up to force surface 96 away from O-ring 98 and against the biasing force of spring 72, so that lubricant under the operating pressure of the engine enters bore 46 then passage 32 to further impinge against diaphragm 20 and fill reservoir 18 to such a volume that the operating pressure of the lubricating system will be equal to the biasing force of coil spring 24. When this equalization of forces occurs, coil spring 72 can then bias piston 86 against O-ring 98 and seal in the lubricant in reservoir 18 under a pressure now equivalent to the operating pressure of the engine. Of course, conventional lubricating lines provide communication for lubricant to those surfaces most in need of lubrication and are a matter of design of each particular engine. Now, with lubricant stored in reservoir 18 under pressure, closing of starter switch 67 as is usually done in the proper starting of the engine, actuates solenoid 58 to pull armature 70 against the biasing force of spring 72 so that spheroidal surface 96 no longer contacts O-ring 98 in communication is now had between reservoir 18 and bore 54 then to a lubricating line communicating with bore 54. At this time, the conventional lubricating system of the engine has not been sufficiently operative to build up an operating pressure for the lubricant, and to serve this purpose, the lubricant under pressure for reservoir 18 rushes outwardly through passage 32 and bore 46 into bore 54 to provide lubrication during this initial period.

The design of piston 86 in this preliminary lubricating device is of particular importance, because the paraboloidal surface of piston 86 utilizes the pressurized flow of lubricant from reservoir 18 into bore 54 and also from bore 54 into reservoir 18 to make more efficient the opening of the valve member and removal of piston 86 to its closed position. That is, lubricant flowing from reservoir 18 impinges against the paraboloidal surface and continues to hold the valve open until the pressure drops considerably once the solenoid has caused initial opening; likewise, when the operating pressure of the lubricating system initially forces surface 96 away from O-ring 98, the further flow of fluid from bore 54 into reservoir 18 impinges against paraboloidal surface 94 to assist in opening the valve in that direction.

After the initial starting period when the engine has started, the conventional starting circuit is open and as a result the solenoid 58 of this invention becomes inoperative permitting coil spring 72 to bias piston 86 to its closed position with surface 96 against O-ring 98.

Figure 2:
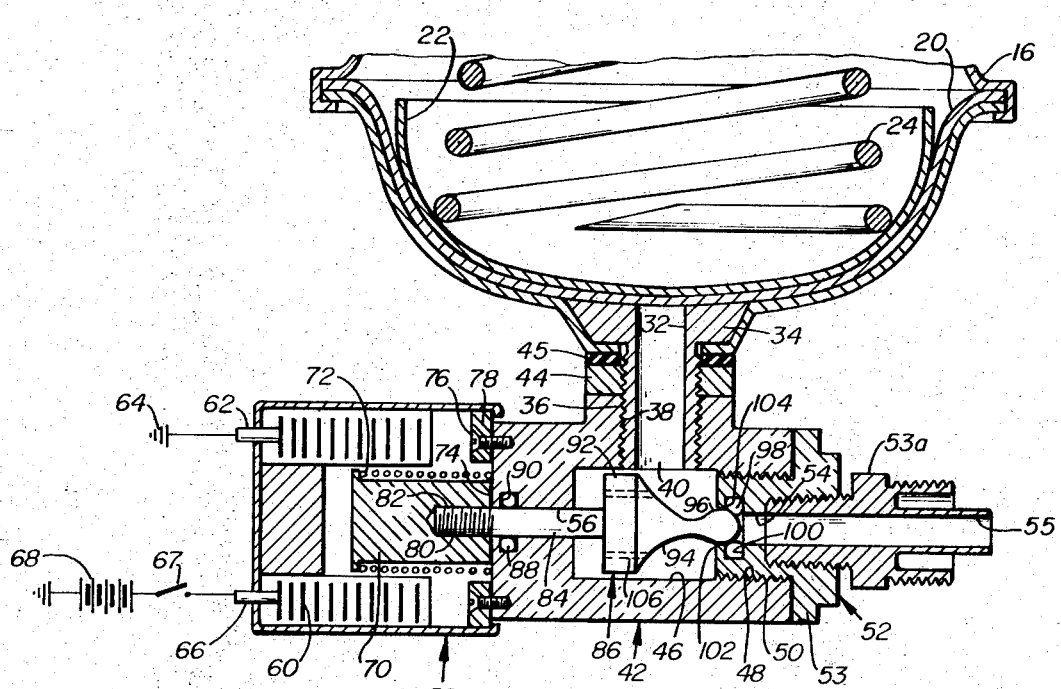
FIG. 2 is a fragmentary sectional view similar to FIG. 1 showing a valve portion of the device in closed condition.
Figure 3:
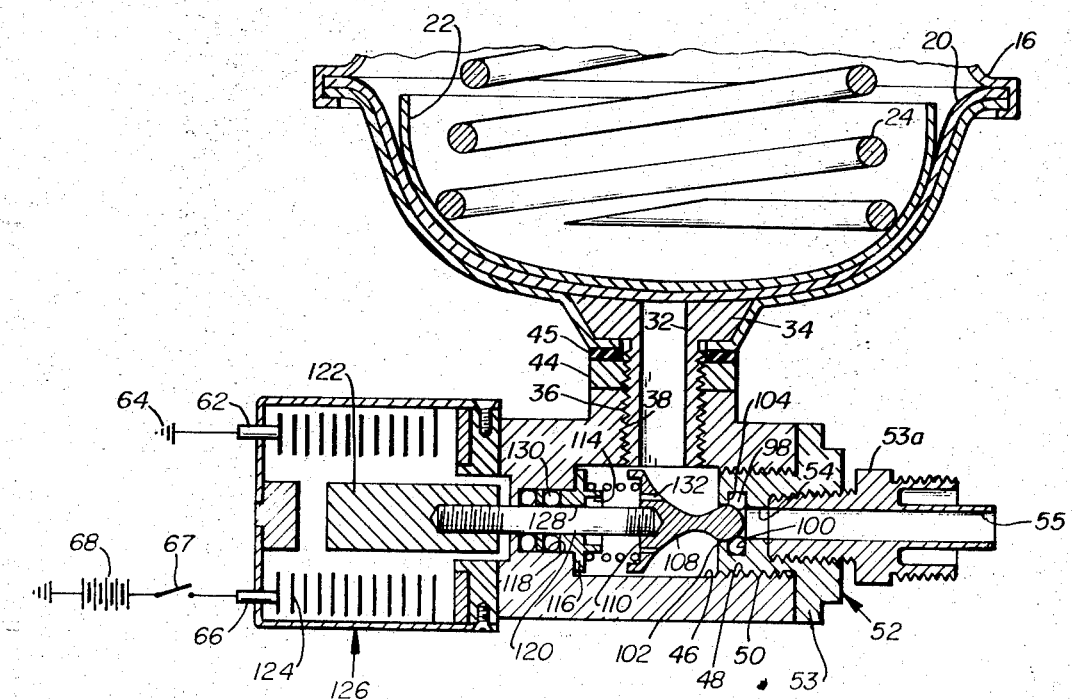
FIG. 3 is a fragmentary sectional view of an alternate embodiment.

FIG. 3 describes an alternate embodiment of a preoiler according to this invention. In this embodiment a coil spring biasing the piston to a normally closed position is located with the bore of the valve body. Piston 108 contains a recess 110 against which one end of coil spring 112 is biased. The other end of spring 112 rests against a shoulder 114 of fitting 116 positioned in reduced bore 118 of valve body 42. A shaft 120 is secured at one end to piston 108 and at the other end to armature 122. Armature 122 is actuated by current flowing through coils 124 in solenoid 126 in the same manner as the device described by FIGS. 1 and 2. Shaft 120 passes through a bore 128 in fitting 116 and is maintained in a sealable relationship within valve body 42 by cooperation of O-rings 130 with the surface of shaft 120. Piston 108 includes a passageway 132 which permits oil to pass from a trapped position behind piston 108 to the front of piston 108. The geometry of passageway 132 in relation to piston 108 is so chosen that the flow of any oil through passageway 132 during operation of the lubricating device will not interfere with the flow of lubricant between bore 55 and bore 32. The embodiment shown in FIG. 3 operates in the same manner as the device described in FIGS. 1 and 2.

Manual release of piston 86 may be provided by a cable 134 attached to piston shaft 84, which cable may lead to a button 136 positioned on the automobile dash or at some other remote spot from the lubricating device.

In another embodiment of the invention, where line 55 leads to the valve system of the engine rather than to the pressurizable lubricating system, a return line 138 having therein a check valve 140 and communicating with a passageway 142 in the valve body which is in further communication with bore 46, provides means for return flow of lubricating fluid. That is, line 55 may be attached to fittings leading to the valve system of the engine which is unpressurized. Then, after providing lubrication for the valve system, the lubricating fluid is collected in the usual reservoir system, as the crankcase, which is in communication with the oil pump. Then the oil pump pressurizes the lubricating fluid and returns it under pressure to the preliminary lubricating device through line 138, at the proper time, where the lubricant can now be pumped under pressure into reservoir 18.

The lubricating system of this invention may be incorporated into a mechanical system such as an electric air compressor where the solenoid valve of this invention becomes operative when the electrical circuit is completed as distinguished from the starter circuit of an internal combustion engine. In such an electric compressor, the electric circuit will be maintained in completed arrangement, of course, during all the while the compressor is operating, and thus the solenoid valve would be actuated all during this period. When the compressor is stopped by the opening of the circuit, the solenoid valve will be inactivated and the piston will prevent communication between the reservoir and lubricating lines. Then, when the circuit is again closed, the solenoid will be actuated to permit pressurized lubricant to flow from the reservoir.

Since many different embodiments of this invention may be made without departing from the spirit and scope of this disclosure, it is to be understood that the specific embodiments described in detail herein are not to be taken in a limiting sense, since the scope of the invention is best defined by the appended claims.

I claim:

1. A preliminary lubricating device for an engine having an electrical circuit and a pressurizable lubricating system, comprising:
    a lubricant reservoir having an opening therein communicating with a discharge conduit depending from said reservoir, said reservoir having means to provide pressurized storage of lubricant;
    a valve body depending from said reservoir having a first bore communicating with a line of said lubricating system and a second bore communicating with both said first bore and said discharge conduit;
    a piston within said second bore and having a medial substantially paraboloidal surface exposable to impinging flow of lubricant from either said first bore or said discharge conduit into said second bore, said piston surface terminating at one end with an anterior spheroidal surface abutting closure means relative to said first bore to constitute said first closed position;
    a shaft extending from the other end of said piston sealably exteriorly of said valve body;
    a solenoid valve having a field coil connected in series to said electrical circuit, said solenoid including an armature coaxial with and attached to said piston shaft; and
    means biasing said piston to a normally closed position, said means being responsive to actuation of said solenoid wherein said piston is brought to an open position allowing said pressurized lubricant to flow from said reservoir into said lubricating system.

2. A preliminary lubricating device as described in claim 1 wherein: said electrical circuit includes an ignition circuit, said ignition circuit further includes a starter circuit, and said solenoid is in series relationship to said starter circuit.

3. A preliminary lubricating device as described in claim 2 wherein: said means to provide pressurized storage of lubricant in said reservoir includes a resilient diaphragm dividing said reservoir into a first and a second compartment, a rigid pressure plate abutting said diaphragm, and spring means abutting said plate and biasing said plate and said diaphragm toward said opening in said reservoir.

4. A preliminary lubricating device as described in claim 3 wherein: said closure means includes a resilient member disposed within a circumferential channel in said first bore, a first wall of said channel having a rounded edge acting as stop means to limit movement of said piston after contact of said piston with said resilient member.

5. A preliminary lubricating device as described in claim 4 wherein: said means biasing said piston to a normally closed position includes coil spring means disposed around said armature.

6. A preliminary lubricating device as described in claim 5 wherein: said means biasing said piston to a normally closed position includes coil spring means disposed around said piston shaft.

7. A preliminary lubricating device as described in claim 1 including means providing for manual release of said piston.

8. A preliminary lubricating device as described in claim 1 wherein said solenoid armature is attached to said piston shaft through mechanical advantage linkage.